(12) United States Patent
Xie et al.

(10) Patent No.: US 12,479,038 B2
(45) Date of Patent: Nov. 25, 2025

(54) HANDHELD LITHIUM BATTERY THREADING MACHINE AND THREADING METHOD

(71) Applicant: Hangzhou Hongli Pipe Machinery Co., Ltd, Hangzhou (CN)

(72) Inventors: Hongwu Xie, Hangzhou (CN); Chenchen Fei, Hangzhou (CN)

(73) Assignee: Hangzhou Hongli Pipe Machinery Co., Ltd, Hangzhou (CN)

(*) Notice: Subject to any disclaimer, the term of this patent is extended or adjusted under 35 U.S.C. 154(b) by 472 days.

(21) Appl. No.: 17/951,144

(22) Filed: Sep. 23, 2022

(65) Prior Publication Data

US 2023/0097943 A1 Mar. 30, 2023

(30) Foreign Application Priority Data

Sep. 28, 2021 (CN) .......................... 202111144396.3

(51) Int. Cl.
*B23G 1/24* (2006.01)
*B23G 1/04* (2006.01)
(Continued)

(52) U.S. Cl.
CPC .................. *B23G 1/24* (2013.01); *B23G 1/46* (2013.01); *B23G 1/52* (2013.01); *B23G 1/04* (2013.01);
(Continued)

(58) Field of Classification Search
CPC ..... B23G 1/52; B23G 1/22–1/24; B23G 1/46; B23G 5/10–5/12; H01M 50/262; H01M 50/247; H01M 2220/30
See application file for complete search history.

(56) References Cited

U.S. PATENT DOCUMENTS

| 4,642,002 A * | 2/1987 | Wagner ................... B23G 1/52 470/134 |
| 2019/0283157 A1* | 9/2019 | VanDaalwyk ........... B23G 1/24 |

(Continued)

FOREIGN PATENT DOCUMENTS

| CN | 2119981 U | 10/1992 |
| GB | 2112585 A * | 7/1983 |
| WO | WO-2017/189786 A1 * | 2/2017 |

OTHER PUBLICATIONS

Stuart, "New Milwaukee M18 Fuel Cordless Pipe Threader, an 'Industry First'", Jul. 25, 2019, from https://toolguyd.com/milwaukee-m18-fuel-cordless-pipe-threader/.*

*Primary Examiner* — Erica E Cadugan
(74) *Attorney, Agent, or Firm* — Bayramoglu Law Offices LLC

(57) ABSTRACT

A handheld lithium battery threading machine includes a die head, a motor assembly, a lithium battery assembly, a toothed disc assembly, a support arm body assembly, and a gearbox assembly. The lithium battery assembly is connected to the motor assembly. The motor assembly and the toothed disc assembly are respectively mounted at both ends of the gearbox assembly. The die head is mounted on the toothed disc assembly, and the support arm body assembly is mounted on the gearbox assembly and matched with the die head. The motor assembly includes a motor, a male plug, a main switch, a handle, an air inlet window, and an air outlet window, where the motor, the male plug, and the main switch are all mounted on the handle. Both the air inlet window and the air outlet window are arranged on the handle.

8 Claims, 17 Drawing Sheets

(51) Int. Cl.
    *B23G 1/46*     (2006.01)
    *B23G 1/52*     (2006.01)
    *H01M 50/247*     (2021.01)
    *H01M 50/262*     (2021.01)
    *H02J 7/00*     (2006.01)

(52) U.S. Cl.
    CPC ...... *B23G 2240/12* (2013.01); *B23G 2240/40* (2013.01); *H01M 50/247* (2021.01); *H01M 50/262* (2021.01); *H01M 2220/30* (2013.01); *H02J 7/0045* (2013.01); *Y02E 60/10* (2013.01)

(56) References Cited

U.S. PATENT DOCUMENTS

| | | | |
|---|---|---|---|
| 2020/0189017 A1* | 6/2020 | Ceroll | B23B 31/102 |
| 2022/0193804 A1* | 6/2022 | Kruepke | B23G 1/52 |
| 2022/0362869 A1* | 11/2022 | Reed | B23G 1/24 |

\* cited by examiner

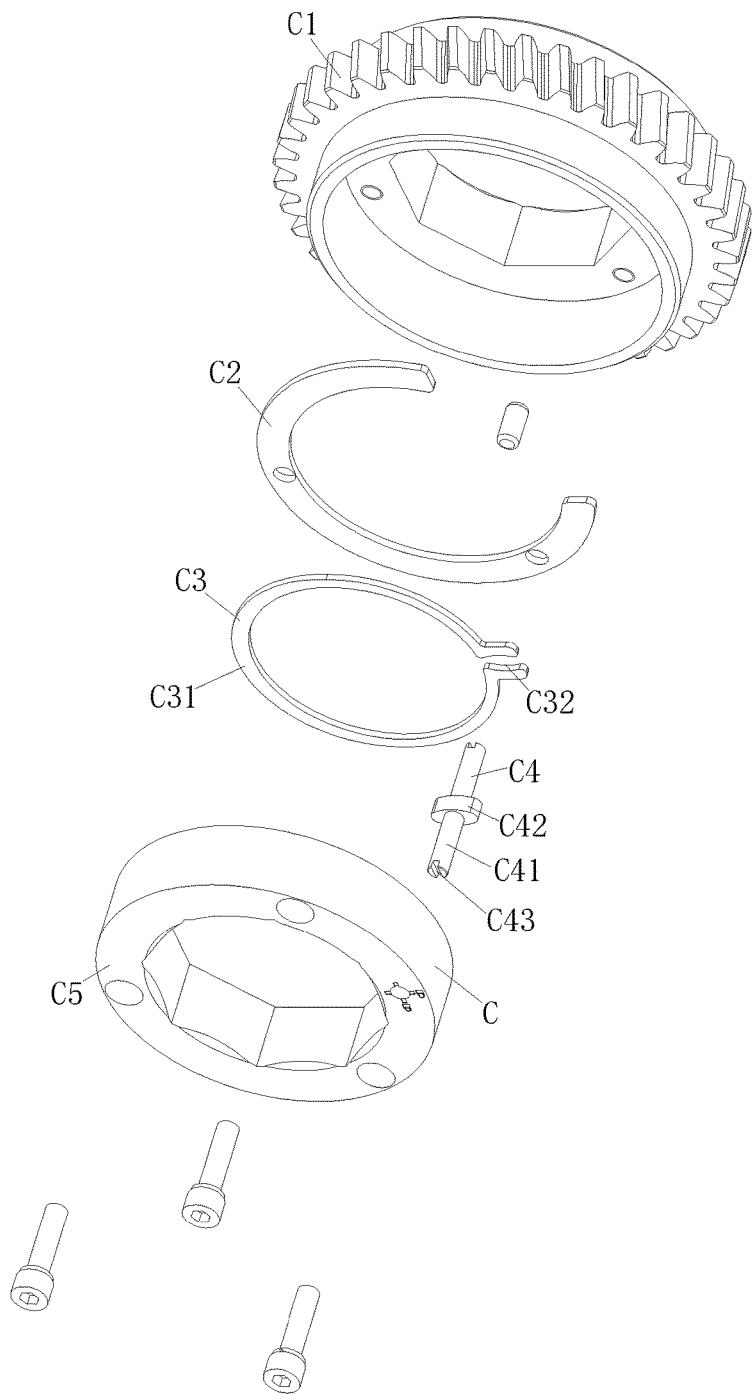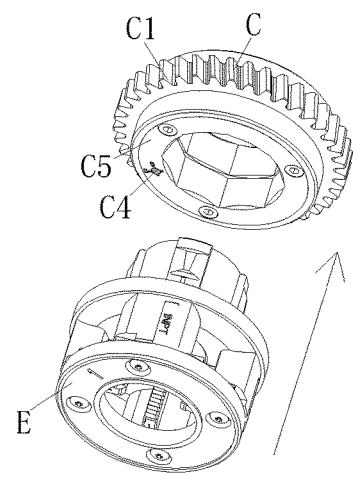
FIG. 13
FIG. 14

Spraying Oil for Threading to the Pipe Fitting Through a Gap of the Die Head

FIG. 26

HANDHELD LITHIUM BATTERY THREADING MACHINE AND THREADING METHOD

CROSS REFERENCE TO THE RELATED APPLICATIONS

This application is based upon and claims priority to Chinese Patent Application No. 202111144396.3, filed on Sep. 28, 2021, the entire contents of which are incorporated herein by reference.

TECHNICAL FIELD

The present disclosure relates to a handheld lithium battery threading machine and a threading method, which belong to the field of external thread processing devices. The threading machine is mainly configured for maintenance in the pipeline connection in industries such as gas, construction, petroleum, and chemical industries, and can also be used as an outdoor power driving device.

BACKGROUND

Most of the existing handheld threading machines are driven by a universal motor, which has a large size and produces lots of noise. A brushless motor using a lithium battery is not only light in weight and low in noise, but also has a much higher safety performance than the universal motor which uses an alternating current power supply. In addition, after the universal motor is operated for a long time, the carbon brush of the threading machine will be worn out and needs replacing.

In view of this, Chinese patent No. CN92207560.3 discloses a handheld electric threading machine. This threading machine needs to connect to a power supply through a plug, so it is inconvenient to use in the outdoor operation, and the transmission structure is also unstable.

SUMMARY

An objective of the present disclosure is to overcome the foregoing shortcomings in the prior art by providing a handheld lithium battery threading machine having an improved structural design and a threading method.

The present disclosure adopts the following technical solutions to solve the above problems: The handheld lithium battery threading machine includes at least one die head. The structural features of the handheld lithium battery threading machine are as follows: The handheld lithium battery threading machine further includes a motor assembly, a lithium battery assembly, a toothed disc assembly, a support arm body assembly, and a gearbox assembly. The lithium battery assembly is connected to the motor assembly, and the motor assembly and the toothed disc assembly are respectively mounted at both ends of the gearbox assembly. The die head is mounted on the toothed disc assembly, and the support arm body assembly is mounted on the gearbox assembly and matched with the die head. The motor assembly includes a motor, a handle, an air inlet window, and an air outlet window, where the motor is mounted on the handle. Both the air inlet window and the air outlet window are arranged on the handle.

Furthermore, the motor assembly further includes a male plug and a main switch. Both the male plug and the main switch are mounted on the handle. The motor is connected to the male plug and the main switch, and the male plug is connected to a female plug of the lithium battery assembly.

Furthermore, the handle includes a front handle and a rear handle, where the front handle is connected to the rear handle. Each of the front handle and the rear handle is provided with the air inlet window and the air outlet window.

Furthermore, the motor includes a motor body, a motor control panel, a signal seven-plug connector, a power three-plug connector, and a signal three-plug connector, where both the motor body and the motor control panel are mounted in the handle. The motor body is connected to the motor control panel through the signal seven-plug connector and the power three-plug connector. The motor control panel is connected to the main switch through the signal three-plug connector, and the motor control panel is connected to the male plug.

Furthermore, the motor body is a brushless motor. The motor body includes a motor rotor assembly, a motor stator assembly, a motor housing, a motor positioning recess, a motor positioning lug, and a bearing, where the motor stator assembly is sleeved outside the motor rotor assembly. Both the motor rotor assembly and the motor stator assembly are mounted in the motor housing, the motor positioning recess is arranged on an outer wall of the motor stator assembly. The motor positioning lug is arranged on an inner wall of the motor housing and located in the motor positioning recess. Both ends of the motor rotor assembly are mounted on the motor housing through the bearing. The motor body is mounted on a gearbox housing of the gearbox assembly.

Furthermore, the motor housing includes a front motor housing and a rear motor housing, where the front motor housing is connected to the rear motor housing. Each of an inner wall of the front motor housing and an inner wall of the rear motor housing is provided with the motor positioning lug.

Furthermore, the lithium battery assembly includes a battery cover, a battery box, a battery cell, a battery control panel, two buckle mechanisms, and a female plug, where the female plug is arranged on the battery control panel. The battery cell is connected to the battery control panel. Both the battery cell and the battery control panel are mounted in the battery box. The battery cover is mounted on the battery box, and the two buckle mechanisms are both mounted on the battery cover.

Furthermore, the lithium battery assembly further includes a battery limiting recess and a battery limiting lug, where the battery limiting recess is arranged on the handle of the motor assembly. The battery limiting lug is arranged on the battery cover and located in the battery limiting recess.

Furthermore, each buckle mechanism includes a buckle button, a buckle pressure spring, a buckle positioning pillar, a buckle fixture block, and a buckle slot. The buckle button is mounted on the battery cover. The buckle positioning pillar and the buckle fixture block are both arranged on the buckle button. The buckle pressure spring is sleeved on the buckle positioning pillar and provided with two ends in a butt joint with the battery cover and the buckle button. The buckle slot is arranged on a side wall of the battery limiting recess, and the buckle fixture block is located in the buckle slot.

Furthermore, the toothed disc assembly includes a first toothed disc, a gasket, a first retainer ring, an eccentric shaft, and an internal octagonal component. The gasket, the first retainer ring, and the internal octagonal component are all mounted on the first toothed disc. The gasket is sleeved outside the first retainer ring. The two ends of the eccentric shaft are respectively mounted on the first toothed disc and an internal octagonal component, and the first retainer ring is matched with the eccentric shaft.

Furthermore, the first retainer ring includes a first retainer ring body and a retainer ring opening, where the retainer ring opening is arranged on the first retainer ring body. The eccentric shaft includes an eccentric shaft body and an eccentric shaft bump, where the eccentric shaft bump is arranged on the eccentric shaft body and located in the retainer ring opening.

Furthermore, an end of the eccentric shaft body is provided with an eccentric shaft groove.

Furthermore, an octagonal hole arranged on the internal octagonal component is superposed with an octagonal opening arranged on the first toothed disc.

Furthermore, the first retainer ring is clamped in a die head clamping groove of the die head.

Furthermore, the toothed disc assembly includes a second toothed disc, a pressure spring, a limiting disc, and a second retainer ring. The limiting disc is rotatably mounted on the second toothed disc through the second retainer ring, and the two ends of the pressure spring respectively abut against the second toothed disc and the limiting disc.

Furthermore, the second toothed disc includes a second toothed disc body and a toothed disc limiting groove, where the toothed disc limiting groove is arranged on the second toothed disc body. The limiting disc includes a limiting disc body and a limiting disc lug, where the limiting disc lug is arranged on the limiting disc body and located in the toothed disc limiting groove.

Furthermore, the pressure spring is located in the toothed disc limiting groove and provided with two ends in a butt joint with the toothed disc limiting groove and the limiting disc lug.

Furthermore, an octagonal hole arranged on the limiting disc is superposed with or staggered from an octagonal opening arranged on the second toothed disc.

Furthermore, the limiting disc is clamped in the die head clamping groove of the die head.

Furthermore, the gearbox assembly includes a gearbox housing and a transmission mechanism, where the transmission mechanism is mounted in the gearbox housing and provided with two ends that fit with the motor assembly and the toothed disc assembly.

Furthermore, the transmission mechanism includes a small arc-tooth conical shaft, a large arc-tooth conical gear, a first-stage gear shaft, a second-stage gear shaft, a third-stage gear shaft, and a transition gear. The small arc-tooth conical shaft is mounted on the motor of the motor assembly and engaged with the large arc-tooth conical gear, and the large arc-tooth conical gear is mounted on the first-stage gear shaft. The first-stage gear shaft is engaged with the second-stage gear shaft, the second-stage gear shaft is engaged with the third-stage gear shaft, the third-stage gear shaft is engaged with the transition gear, and the transition gear is engaged with the toothed disc assembly.

Furthermore, the support arm body assembly includes a support arm body bracing piece, a support arm body, a support arm body ejector pin, and a support arm body handle. The support arm body bracing piece and the support arm body ejector pin are both mounted on the support arm body, and the support arm body handle is mounted on the support arm body ejector pin.

Furthermore, another technical objective of the present disclosure is to provide a threading method of a handheld lithium battery threading machine.

The foregoing technical objectives of the present disclosure are achieved by using the following technical solutions.

The threading method of a handheld lithium battery threading machine includes the following steps:

S1, preparation before work, specifically as follows:

S11, fixing a support arm body assembly on a pipe fitting to be processed, as shown in FIG. 1, rotating a support arm body handle clockwise, such that a support arm body ejector pin can move toward the pipe fitting, and forcedly rotating the support arm body handle to fix the pipe fitting between a support arm body and the support arm body ejector pin; and S12, placing a die head into a toothed disc assembly, as shown in FIG. 25, sleeving an inner hole of the die head on the pipe fitting by holding a housing handle with one hand, aligning a support arm body bracing piece to a support hole of a gearbox housing, and pushing the handheld lithium battery threading machine to the pipe fitting with the other hand by taking a point B as a stress point to enable an end surface of the pipe fitting to be in contact with a die of the die head; and S2, working stage, specifically as follows:

S21, spraying a little thread-cutting oil for threading to the pipe fitting through a gap of the die head with a thread-cutting oil gun; and S22, pressing an counterclockwise marked end (right-handed threads and left-handed threads are opposite) of a switch reversing rod, holding a point A on a handle of a motor assembly with one hand, pulling up a main switch with a forefinger (the forefinger cannot loosen the button, or the work is stopped) to start the work of a motor body, driving the toothed disc assembly to rotate counterclockwise, pressing the point B with the other hand, applying a little force toward the pipe fitting at the point A and the point B with the two hands, such that the die on the die head can process threads on the pipe fitting, applying no force with the two hands after 0.5 to 1 turn of threads is processed, intermittently spraying the thread-cutting oil for threading to the pipe fitting through the gap of the die head at this time, loosening the forefinger that pulls up the main switch when an end surface of the pipe fitting is flush with an end surface of the die of the die head to stop the work of the motor body, pressing a clockwise marked end of the switch reversing rod, holding the point A on the handle of the motor assembly, pulling up the main switch with the forefinger to enable the motor body to drive the toothed disc assembly and the die head to rotate clockwise, such that the die head is withdrawn from the pipe fitting; and rotating a support arm body handle counterclockwise to separate a support arm body ejector pin from the pipe fitting, and taking down the support arm body assembly to complete processing of pipe external threads of the pipe fitting.

Compared with the prior art, the present disclosure has the following advantages. The handheld lithium battery threading machine uses a brushless motor and a lithium battery for power driving which has the following advantages: (1) externally connecting a power supply during use is not required and safety; (2) low noise; (3) replacing a carbon brush is not required and long life of the motor; and (4) stable output rotational speed, no stall phenomenon, high working efficiency, etc.

The motor body in the motor assembly is fixed in a closed space formed between the front handle and a rear handle on the gearbox assembly, and the motor control panel is also located in this space, as shown in FIG. 5. When the motor body starts to work and rotate, the fan on the motor rotor assembly can generate airflow, and air enters the closed space from the air inlet window on the front handle and the rear handle and then is exhausted from the air outlet window on the two handles, such that heat of the motor body and the motor control panel is dissipated, and the service life of the motor assembly can be prolonged.

The use of the toothed disc assembly can facilitate the replacement of die heads of different sizes, and it is very convenient to switch threads of different sizes.

BRIEF DESCRIPTION OF THE DRAWINGS

FIG. 13 is an exploded view of a first toothed disc assembly according to an embodiment of the present disclosure.

FIG. 14 is a schematic diagram of an assembly structure of a first toothed disc assembly and a die head according to an embodiment of the present disclosure.

FIG. 26 schematically shows a feature of the present disclosure.

Figure 1:
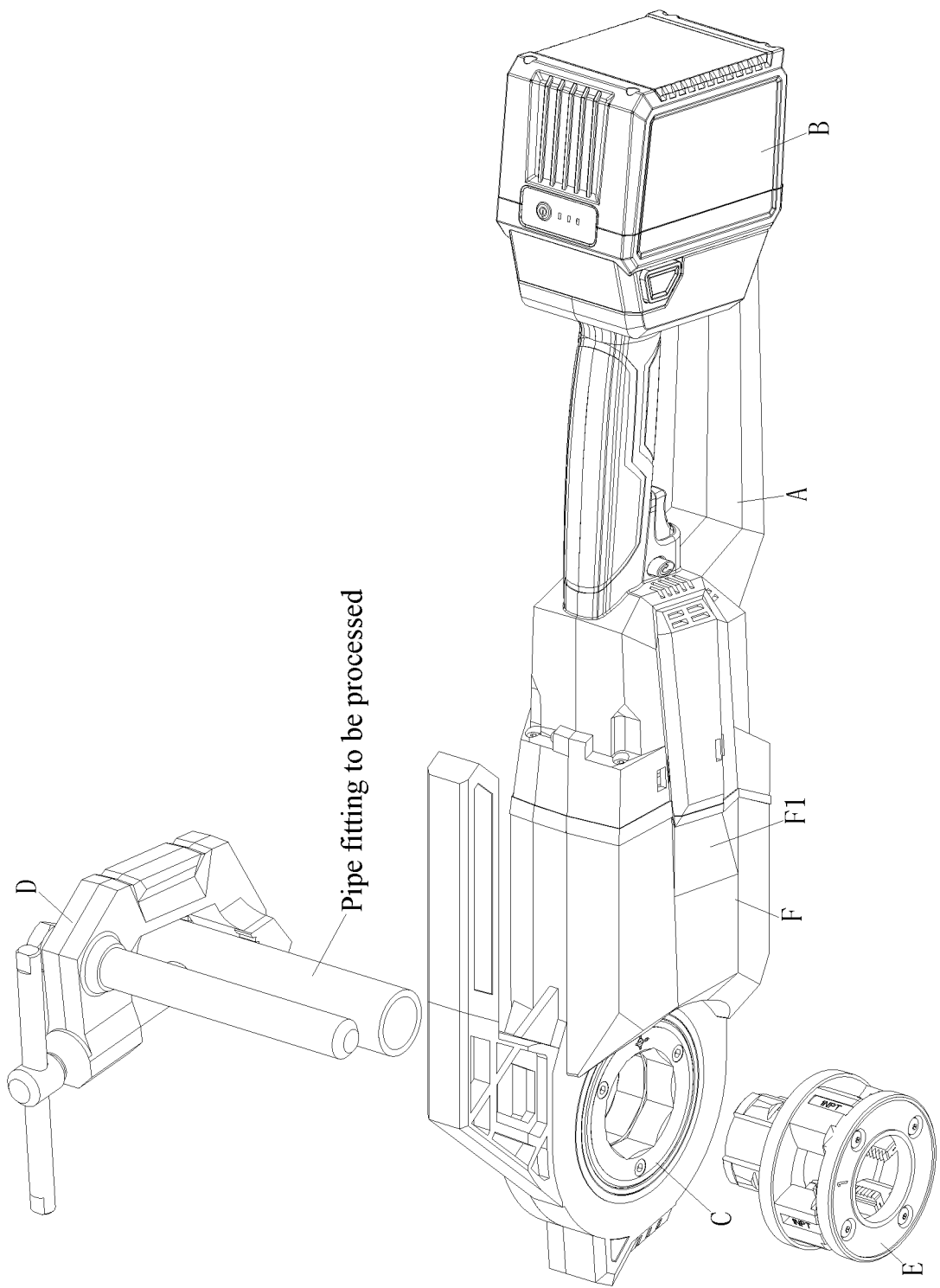
FIG. 1 is an exploded view of a handheld lithium battery threading machine according to an embodiment of the present disclosure.

In the drawings, motor assembly A, lithium battery assembly B, toothed disc assembly C, support arm body assembly D, a die head E, and gearbox assembly F motor A1, male plug A2, main switch A3, front handle A4, rear handle A5, air inlet window A6, air outlet window A7, and switch reversing rod A8 motor body A11, motor control panel A12, signal seven-plug connector A13, power three-plug connector A14, and signal three-plug connector A15 motor rotor assembly A111, motor stator assembly A112, front motor housing A113, rear motor housing A114, motor positioning recess A115, motor positioning lug A116, and bearing A117 battery cover B1, battery box B2, battery cell B3, battery control panel B4, buckle mechanism B5, female plug B6, battery limiting recess B7, and battery limiting lug B8 buckle button B51, buckle pressure spring B52, buckle positioning pillar B53, buckle fixture block B54, and buckle slot B55 first toothed disc C1, gasket C2, first retainer ring C3, eccentric shaft C4, and internal octagonal component C5 first retainer ring body C31 and retainer ring opening C32 eccentric shaft body C41, eccentric shaft bump C42, and eccentric shaft groove C43 second toothed disc C6, pressure spring C7, limiting disc C8, and second retainer ring C9 second toothed disc body C61 and toothed disc limiting groove C62 limiting disc body C81 and limiting disc lug C82 support arm body bracing piece D1, support arm body D2, support arm body ejector pin D3, and support arm body handle D4 die head clamping groove E0 gearbox housing F1, transmission mechanism F2, and housing handle F3 small arc-tooth conical shaft F21, large arc-tooth conical gear F22, first-stage gear shaft F23, second-stage gear shaft F24, third-stage gear shaft F25, and transition gear F26.

DETAILED DESCRIPTION OF THE EMBODIMENTS

The present disclosure is further described below in detail with reference to the accompanying drawings and the embodiments. The following embodiments describe the present disclosure, but the present disclosure is not limited to these embodiments.

Embodiment

Referring to FIG. 1 to FIG. 25, the structure, scale, size, and the like shown in the drawings of this specification are only used to describe the content disclosed in the specification and for those skilled in the art to understand and read, which are not used to limit the limitations for implementing the present disclosure and thus are not technically substantial. Any structural modification, scaling relation change, or size adjustment made without affecting the effects and objectives that can be achieved by the present disclosure shall fall within the scope that can be encompassed by the technical content disclosed in the present disclosure. Moreover, as used herein, the terms such as "upper", "lower", "left", "right", "middle", and "a/an" are merely employed for ease of description and not intended to limit the scope of the present disclosure. The change or adjustment of the relative relationships shall be deemed as falling within the scope of the present disclosure without substantial alteration of technical contents.

In this embodiment, the handheld lithium battery threading machine includes a die head E, a motor assembly A, a lithium battery assembly B, a toothed disc assembly C, a support arm body assembly D, and a gearbox assembly F. The lithium battery assembly B is connected to the motor assembly A. The motor assembly A and the toothed disc assembly C are respectively mounted at both ends of the gearbox assembly F. The die head E is mounted on the toothed disc assembly C, and the support arm body assembly D is mounted on the gearbox assembly F and matched with the die head E.

Specifically, as shown in FIG. 1, the handheld lithium battery threading machine includes the motor assembly A, the lithium battery assembly B, the toothed disc assembly C, the support arm body assembly D, the die head E, and the gearbox assembly F. As a core component of the handheld lithium battery threading machine, the motor assembly A plays the role of connecting the front and the rear, the front end thereof is fixedly connected to the gearbox assembly F, and the rear end thereof is provided with the pluggable lithium battery assembly B, and these three components constitute a body of the handheld threading machine. This body can be used as a field driving device with a certain positioning aid. The support arm body assembly D is fixed and clamped on a pipe to be processed, the die head E is mounted on the toothed disc assembly C, and the toothed disc assembly C is mounted on the gearbox assembly F.

Figure 2:
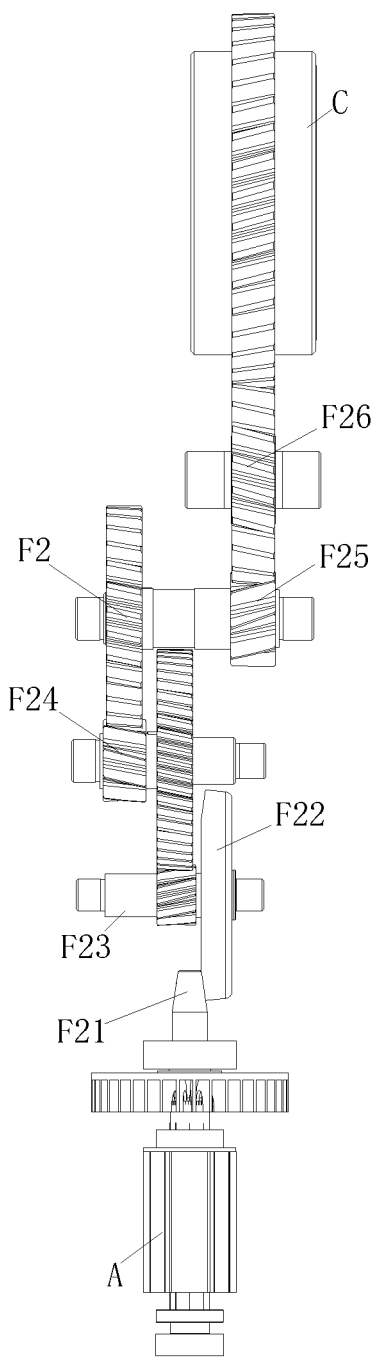
FIG. 2 is a schematic structural diagram of a connection relationship of a transmission mechanism according to an embodiment of the present disclosure.
Figure 3:
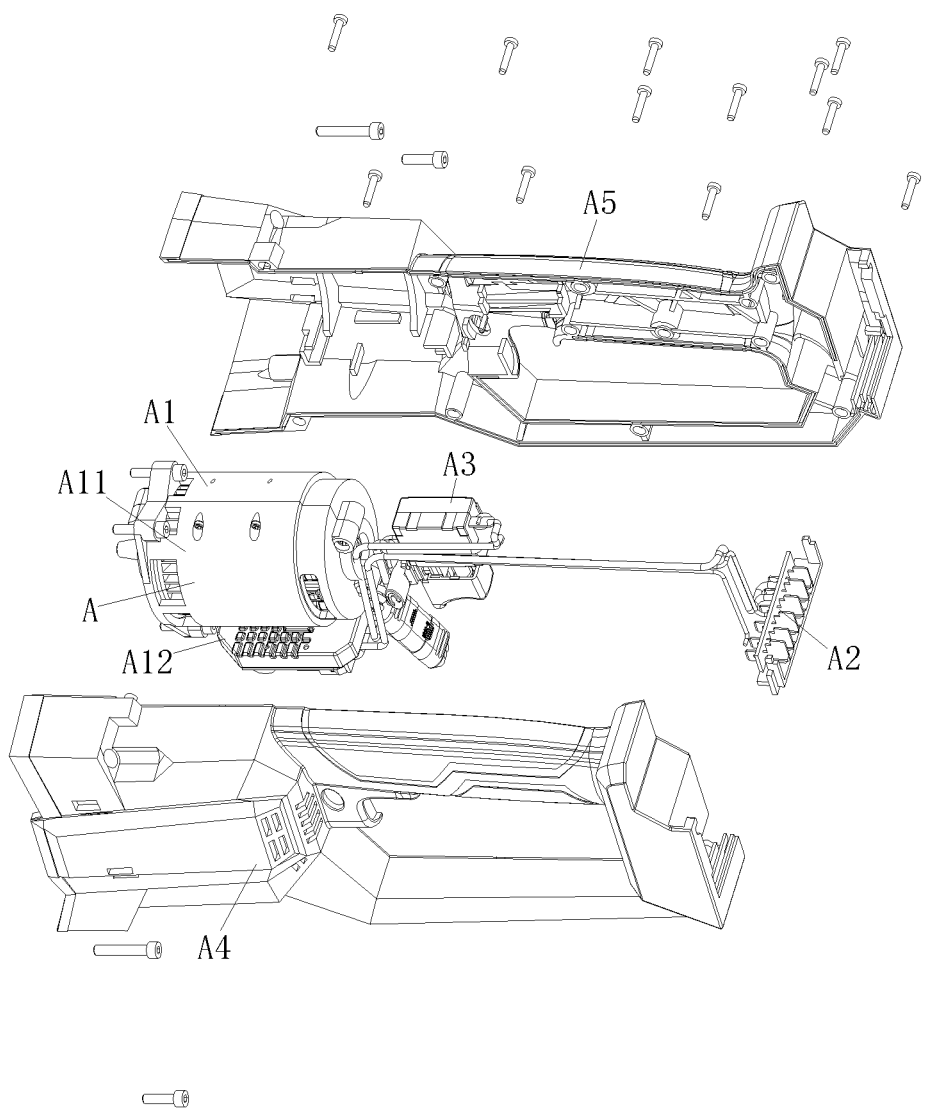
FIG. 3 is an exploded view of a motor assembly according to an embodiment of the present disclosure.
Figure 4:
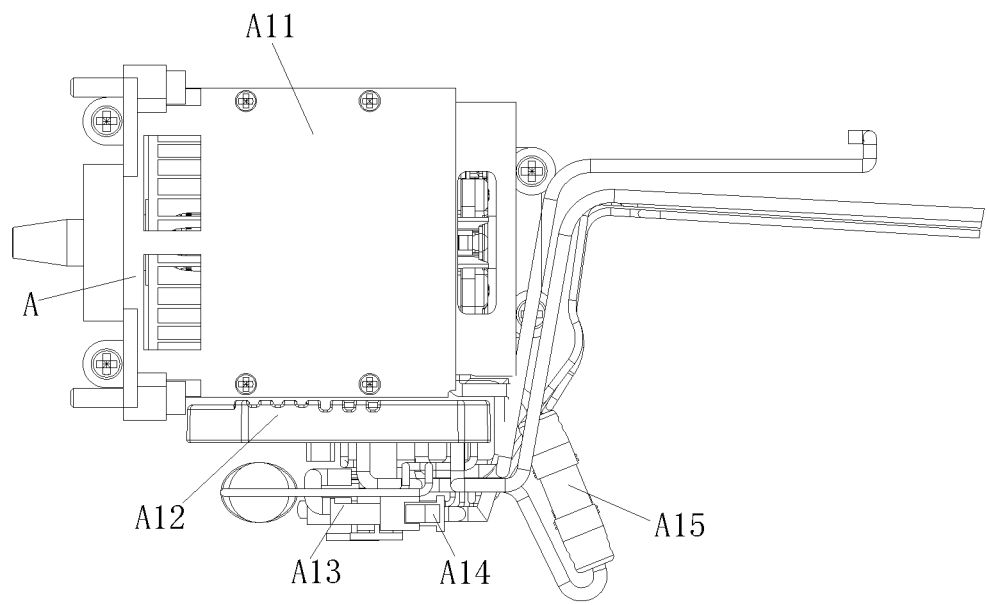
FIG. 4 is a schematic diagram of an internal structure of a motor assembly according to an embodiment of the present disclosure.
Figure 5:
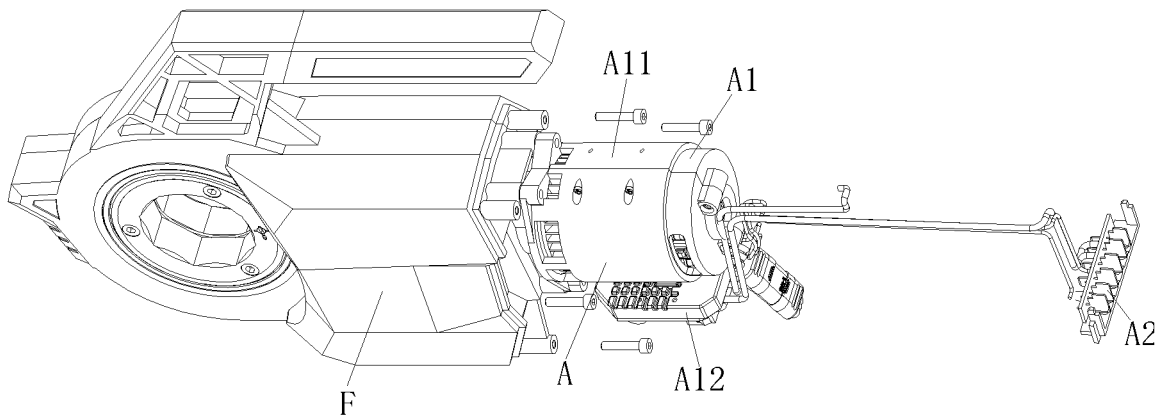
FIG. 5 is a perspective view of a motor assembly according to an embodiment of the present disclosure.
Figure 6:
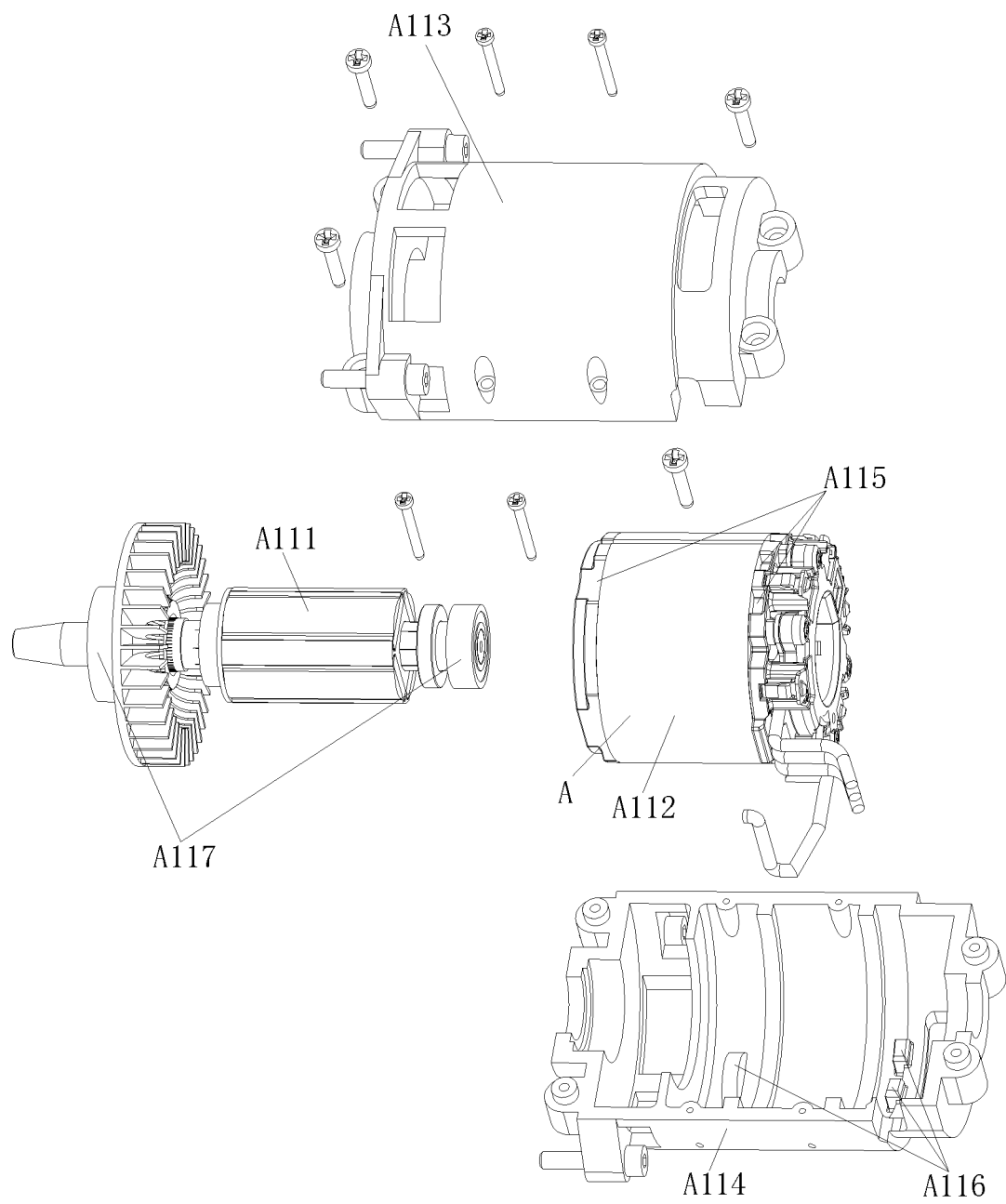
FIG. 6 is an exploded view of a motor body according to an embodiment of the present disclosure.

As shown in FIG. 2, the main function of the motor assembly A is to output a torque. The main function of the lithium battery assembly B is to provide kinetic energy for the motor assembly A. The gearbox assembly F is to turn the torque outputted by the motor assembly A by 90 degrees. After deceleration, the torque is outputted by the toothed disc assembly C.

The main function of the support arm body assembly D is to be easily fixed on the pipe to be processed, and a support arm body bracing piece D1 is inserted into a support hole of the gearbox assembly F to provide radial positioning for the gearbox assembly F so as to restrain a reverse torque generated by threading.

The die head E is inserted into the toothed disc assembly C, and its function is to produce pipe external threads on the pipe to be processed under the rotation of the toothed disc assembly C.

In this embodiment, the motor assembly A includes a motor A1, a male plug A2, a main switch A3, a handle, an air inlet window A6, and an air outlet window A7. The motor A1, the male plug A2, and the main switch A3 are all mounted on the handle. The air inlet window A6 and the air outlet window A7 are both arranged on the handle. The motor A1 is connected to the male plug A2 and the main switch A3. The male plug A2 is connected to a female plug B6 of the lithium battery assembly B, and the main switch A3 is connected to a switch reversing rod A8.

In this embodiment, the handle includes a front handle A4 and a rear handle A5, where the front handle A4 is connected to the rear handle A5. Each of the front handle A4 and the rear handle A5 is provided with the air inlet window A6 and the air outlet window A7.

In this embodiment, the motor A1 includes a motor body A11, a motor control panel A12, a signal seven-plug connector A13, a power three-plug connector A14, and a signal three-plug connector A15. Both the motor body A11 and the motor control panel A12 are mounted in the handle. The motor body A11 is connected to the motor control panel A12 through the signal seven-plug connector A13 and the power three-plug connector A14. The motor control panel A12 is connected to the main switch A3 through the signal three-plug connector A15, and the motor control panel A12 is connected to the male plug A2.

In this embodiment, the motor body A11 is a brushless motor. The motor body A11 includes a motor rotor assembly A111, a motor stator assembly A112, a motor housing, a motor positioning recess A115, a motor positioning lug A116, and a bearing A117. The motor stator assembly A112 is sleeved outside the motor rotor assembly A111, and both the motor rotor assembly A111 and the motor stator assembly A112 are mounted in the motor housing.

In this embodiment, the motor positioning recess A115 is arranged on an outer wall of the motor stator assembly A112. The motor positioning lug A116 is arranged on an inner wall of the motor housing and located in the motor positioning recess A115. Both ends of the motor rotor assembly A111 are mounted on the motor housing through the bearing A117. The motor body A11 is mounted on a gearbox housing F1 of the gearbox assembly F.

In this embodiment, the motor housing includes a front motor housing A113 and a rear motor housing A114. The front motor housing A113 is connected to the rear motor housing A114, and each of an inner wall of the front motor housing A113 and an inner wall of the rear motor housing A114 is provided with the motor positioning lug A116.

Specifically, the motor assembly A includes a motor A1, a male plug A2, a main switch A3, a front handle A4, and a rear handle A5. The motor A1 includes two parts, namely a motor body A11 and a motor control panel A12. The motor body A11, the motor control panel A12, the male plug A2, and the main switch A3 are mounted in the front handle A4 and the rear handle A5 in a limited manner.

The motor body A11 is connected to the motor control panel A12 through the signal seven-plug connector A13 and the power three-plug connector A14. That is to say, between the motor body A11 and the motor control panel A12, a signal line and a power line of the motor body A11 and the motor control panel A12 are respectively connected by the signal seven-plug connector A13 and the power three-plug connector A14. The motor control panel A12 is connected to the main switch A3 through the signal three-plug connector A15. That is to say, there is a signal three-plug male connector on the motor control panel A12, which is communicated with a three-plug female connector of the main switch A3.

The motor housing of the motor body A11 is fixed on the gearbox assembly F through four hexagon socket cap screws (MX20).

The motor body A11 includes a motor rotor assembly A111, a motor stator assembly A112, a front motor housing A113, a rear motor housing A114, etc. The motor rotor assembly A111 and the motor stator assembly A112 are positioned and mounted in the front motor housing A113 and the rear motor housing A114. An outer wall of the motor stator assembly A112 and the motor positioning recess A115 thereon are matched and positioned with an inner wall of the front motor housing A113 and an inner wall of the rear motor housing A114 and the motor positioning lug A116 thereon, so as to ensure the coaxiality and the axial position of the motor stator assembly A112, and eliminate a radial torque generated by the motor stator assembly A112. The bearings A117 at both ends of the motor rotor assembly A111 are matched and positioned with bearing inner holes on the front motor housing A113 and the rear motor housing A114, so as to ensure the coaxility and the axial position of the motor rotor assembly A111 with the front motor housing A113 and the rear motor housing A114. The front motor housing A113 and the rear motor housing A114 are connected together through eight cross recessed pan head tapping screws (four ST2.2X20 and four ST2.9X15).

Figure 7:
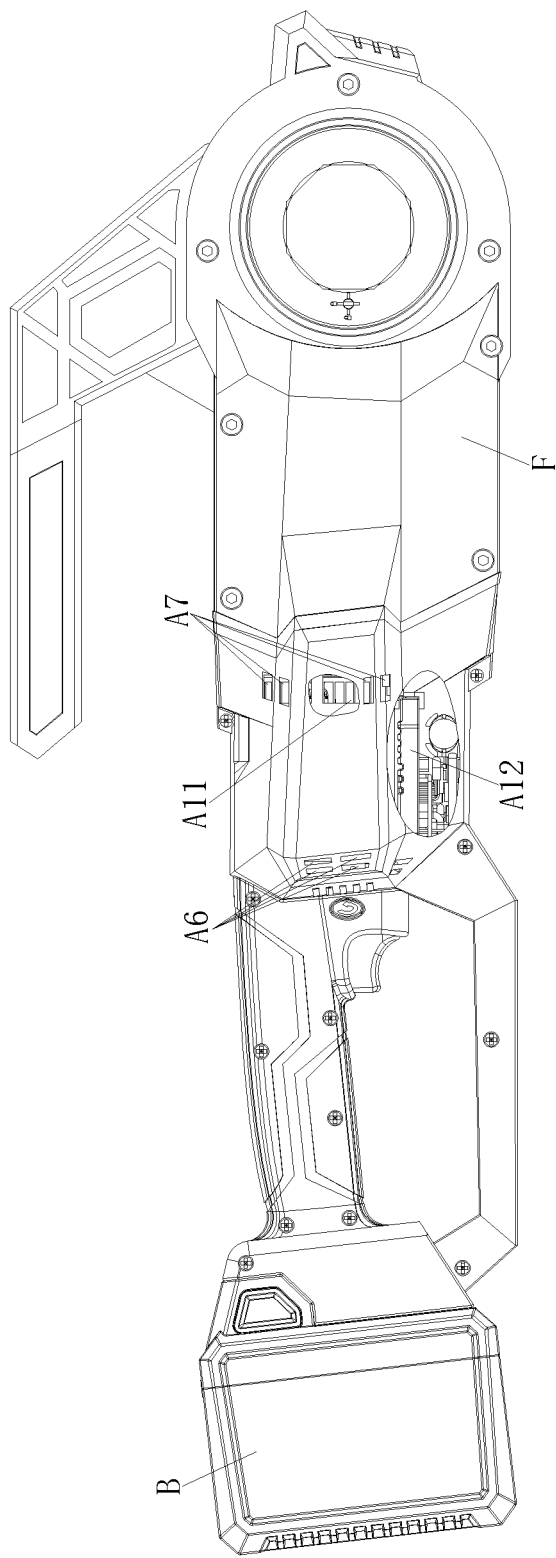
FIG. 7 is a front view of a motor assembly according to an embodiment of the present disclosure.
Figure 8:
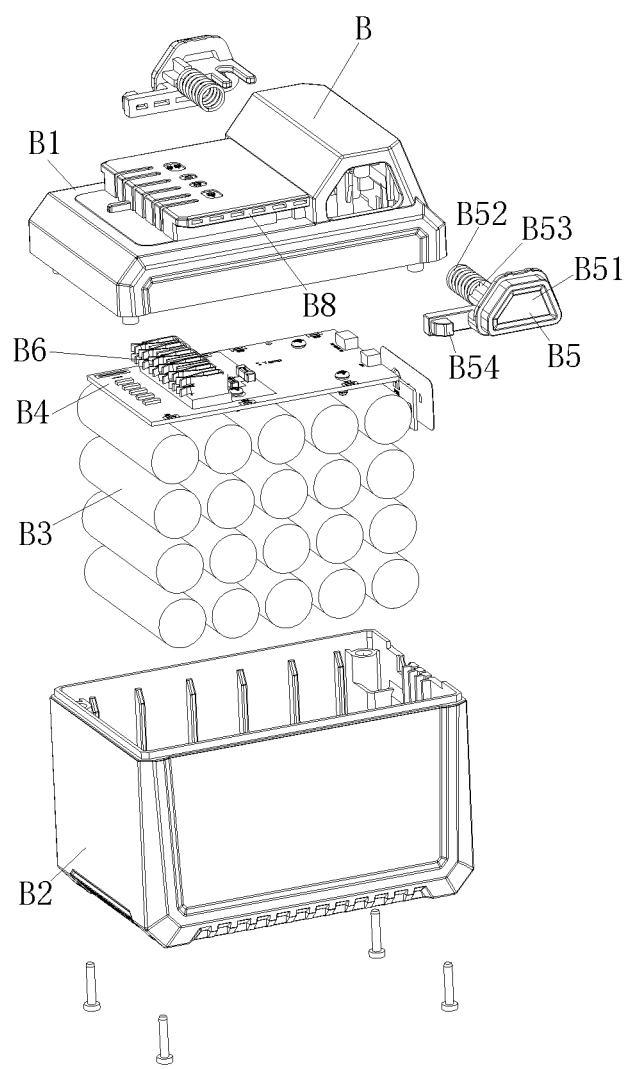
FIG. 8 is an exploded view of a lithium battery assembly according to an embodiment of the present disclosure.

The motor body A11 is fixed on the gearbox assembly F and is also located in a closed space formed between the front handle A4 and the rear handle A5 on the gearbox assembly F. The motor control panel A12 is also located in this space, as shown in FIG. 7. When the motor body A11 starts to work and rotate, the fan on the motor rotor assembly A111 can generate airflow, and air enters the closed space from the air inlet window A6 on the front handle A4 and the rear handle A5 and then is exhausted from the air outlet window A7 on the front handle A4 and the rear handle A5, so as to dissipate heat of the motor body A11 and the motor control panel A12.

In this embodiment, the lithium battery assembly B includes a battery cover B1, a battery box B2, a battery cell B3, a battery control panel B4, two buckle mechanisms B5, a female plug B6, a battery limiting recess B7, and a battery limiting lug B8. The female plug B6 is arranged on the battery control panel B4. The battery cell B3 is connected to the battery control panel B4. Both the battery cell B3 and the battery control panel B4 are mounted in the battery box B2. The battery cover B1 is mounted on the battery box B2. The two buckle mechanisms B5 are both mounted on the battery cover B1. The battery limiting recess B7 is arranged on the handle of the motor assembly A, and the battery limiting lug B8 is arranged on the battery cover B1 and located in the battery limiting recess B7.

In this embodiment, each buckle mechanism B5 includes a buckle button B51, a buckle pressure spring B52, a buckle positioning pillar B53, a buckle fixture block B54, and a buckle slot B55. The buckle button B51 is mounted on the battery cover B1. The buckle positioning pillar B53 and the buckle fixture block B54 are both arranged on the buckle button B51. The buckle pressure spring B52 is sleeved on the buckle positioning pillar B53 and provided with two ends in a butt joint with the battery cover B1 and the buckle button B51. The buckle slot B55 is arranged on a side wall of the battery limiting recess B7, and the buckle fixture block B54 is located in the buckle slot B55.

Specifically, the lithium battery assembly B includes a battery cover B1, a battery box B2, a battery cell B3, a battery control panel B4, buckle mechanisms B5, and a female plug B6. The buckle mechanisms B5 are mounted in the battery cover B1 in a limited manner. The battery cell B3 and the battery control panel B4 are placed in the battery box B2, and the battery cover B1 and the battery box B2 are connected together through four cross recessed pan head tapping screws.

Figure 9:
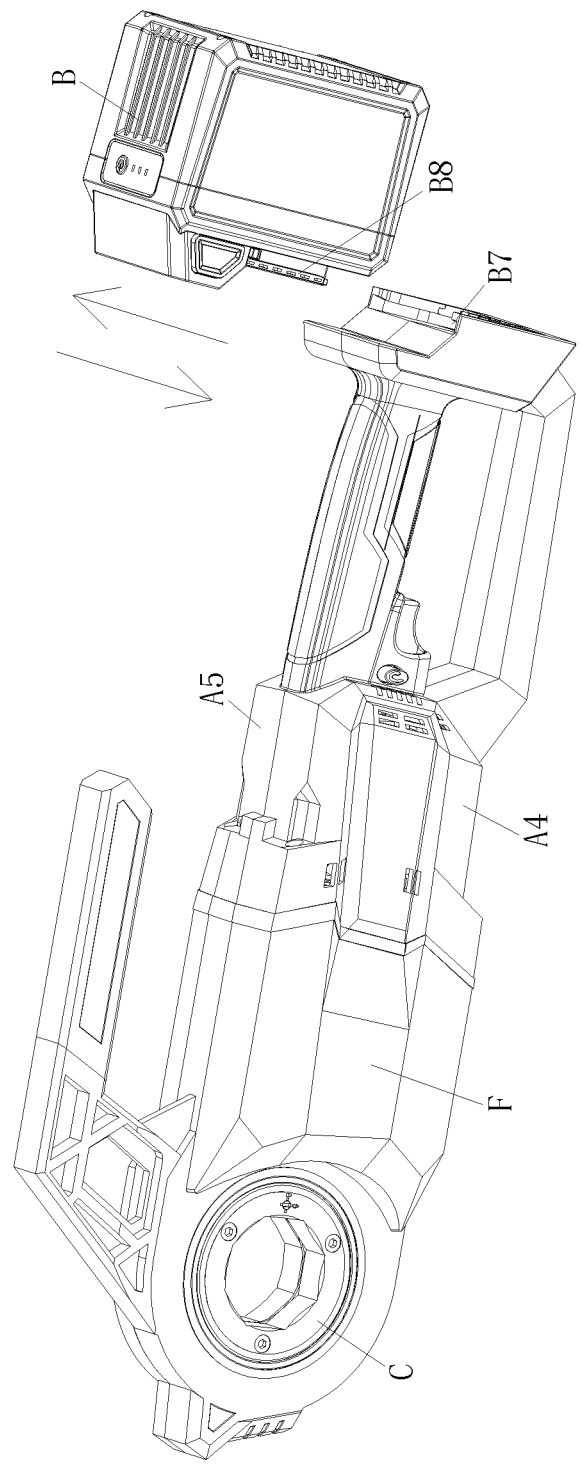
FIG. 9 is a schematic diagram of a mounting structure of a lithium battery assembly according to an embodiment of the present disclosure.

As shown in FIG. 9, the lithium battery assembly B is positioned and inserted on the motor assembly A through the battery limiting lug B8 on the battery cover B1 and the battery limiting recess B7 on the front handle A4 and the rear handle A5. It is inserted during operation and pulled out during charging.

Figure 10:
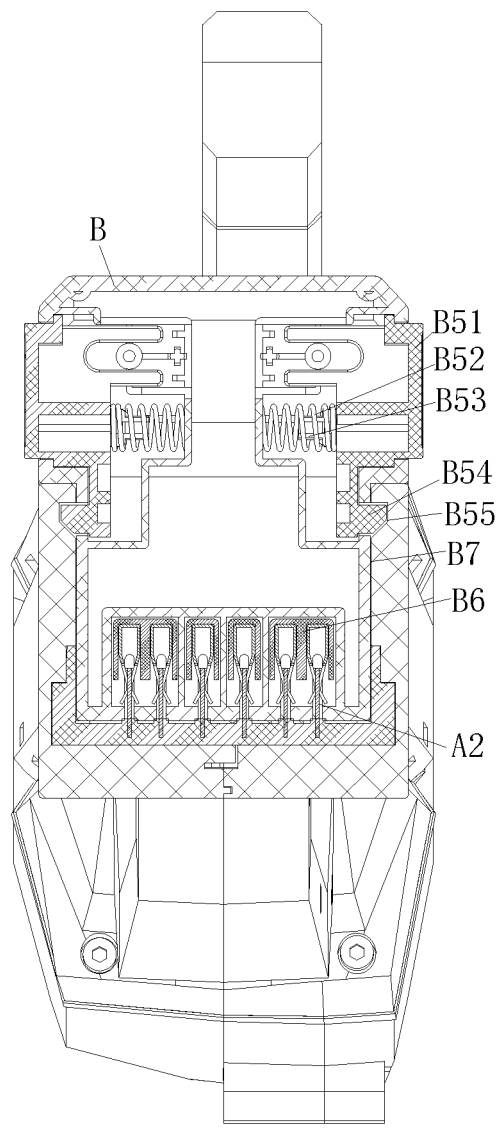
FIG. 10 is a sectional view of a buckle mechanism in a lithium battery assembly when in a clamped state according to an embodiment of the present disclosure.

As shown in FIG. 10, this state is a working state of the lithium battery assembly B. The buckle fixture block B54 is limited in the buckle slot B55 of the front handle A4 and the rear handle A5, such that the lithium battery assembly B cannot be pulled out. At this time, the male plug A2 of the motor assembly A is inserted into the female plug B6 on the battery control panel B4 to connect the lithium battery assembly B to a power supply of the motor A1.

Figure 11:
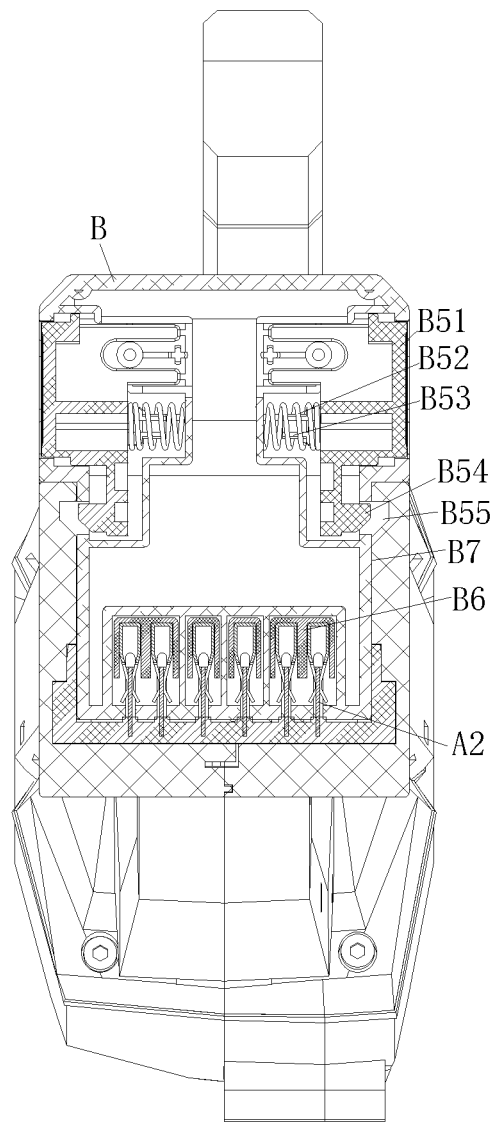
FIG. 11 is a sectional view of a buckle mechanism in a lithium battery assembly when in a loosened state according to an embodiment of the present disclosure.
Figure 12:
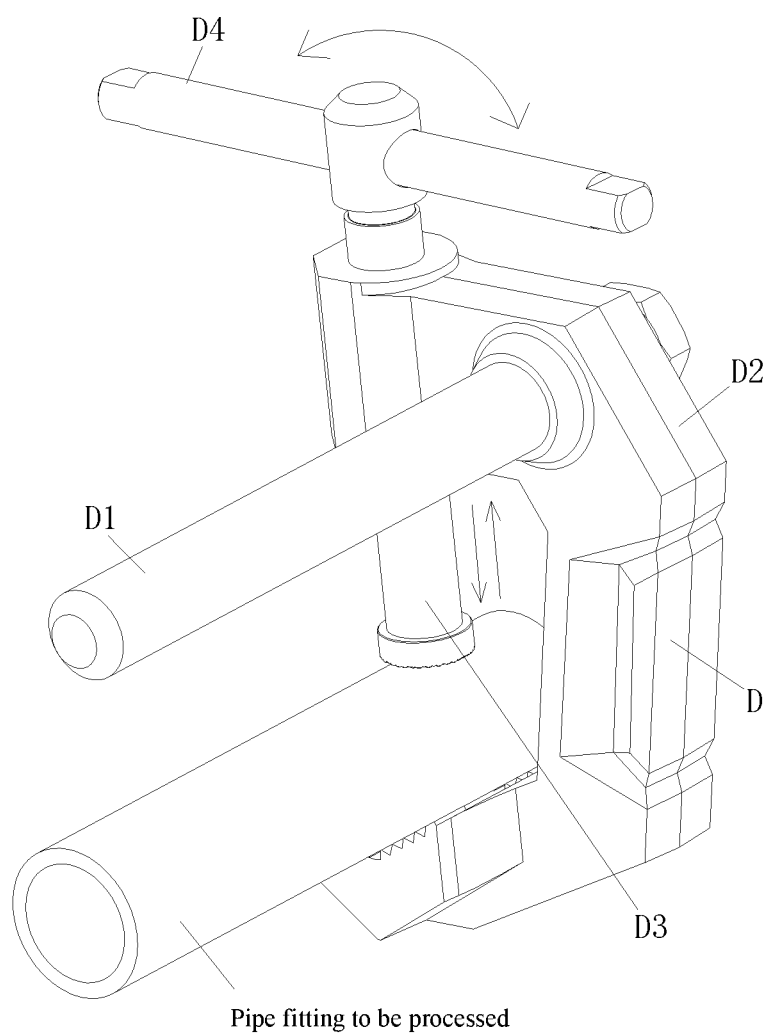
FIG. 12 is a perspective view of a support arm body assembly according to an embodiment of the present disclosure.
Figure 15:
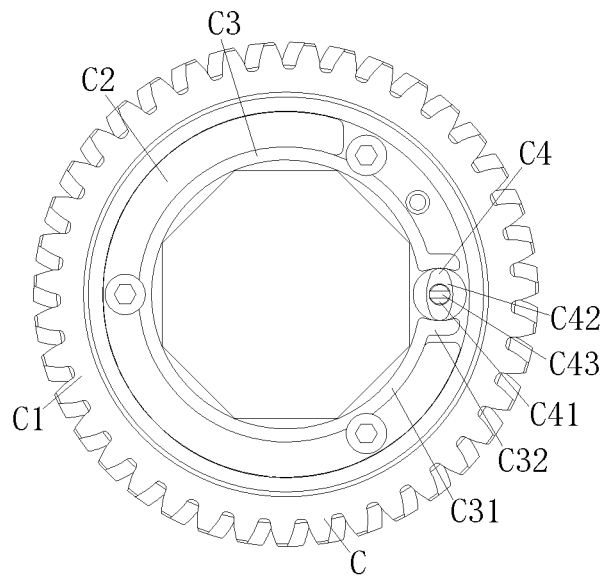
FIG. 15 is a schematic diagram of an assembly structure of a first toothed disc assembly according to an embodiment of the present disclosure.

As shown in FIG. 11, when the buckle button B51 is pressed down, the buckle fixture block B54 on the buckle button B51 is separated from the buckle slot B55 of the front handle A4 and the rear handle A5, such that the lithium battery assembly B can be pulled out from the motor assembly A.

In this embodiment, regarding the first toothed disc assembly C (as shown in FIG. 13 to FIG. 18), the toothed disc assembly C includes a first toothed disc C1, a gasket C2, a first retainer ring C3, an eccentric shaft C4, and an internal octagonal component C5. The gasket C2, the first retainer ring C3, and the internal octagonal component C5 are all mounted on the first toothed disc C1. The gasket C2 is sleeved outside the first retainer ring C3. The two ends of the eccentric shaft C4 are respectively mounted on the first toothed disc C1 and an internal octagonal component C5, and the first retainer ring C3 is matched with the eccentric shaft C4.

In this embodiment, the first retainer ring C3 includes a first retainer ring body C31 and a retainer ring opening C32. The retainer ring opening C32 is arranged on the first retainer ring body C31. The eccentric shaft C4 includes an eccentric shaft body C41 and an eccentric shaft bump C42. The eccentric shaft bump C42 is arranged on the eccentric shaft body C41 and located in the retainer ring opening C32. An end of the eccentric shaft body C41 is provided with an eccentric shaft groove C43.

In this embodiment, an octagonal hole arranged on the internal octagonal component C5 is superposed with an octagonal opening arranged on the first toothed disc C1. The first retainer ring C3 is clamped in a die head clamping groove E0 of the die head E. The eccentric shaft bump C42 is arranged as an elliptical structure. When both ends of a long shaft of the eccentric shaft bump C42 are in contact with the retainer ring opening C32, the first retainer ring body C31 is separated from the die head clamping groove E0. When both ends of a short shaft of the eccentric shaft bump C42 are in contact with the retainer ring opening C32, the first retainer ring body C31 is clamped with the die head clamping groove E0.

Specifically, the gasket C2, the first retainer ring C3, the eccentric shaft C4, and the internal octagonal component C5 are all mounted in the first toothed disc C1 through three hexagon socket cap screws. A cylindrical pin (5×10) limits the first toothed disc C1 and the internal octagonal component C5. The eccentric shaft C4 can rotate, and the diameter of the first retainer ring C3 is increased or decreased. The function of the toothed disc assembly is to provide a torque for the die head E through the internal octagonal component C5 and perform axial limiting.

The eccentric shaft body C41 is rotated to make both ends of the long shaft of the eccentric shaft bump C42 in contact with the retaining ring opening C32. The first retainer ring body C31 can be expanded, and the die head E can be mounted on the toothed disc assembly. The eccentric shaft body C41 is rotated again to make both ends of the short shaft of the eccentric shaft bump C42 in contact with the retaining ring opening C32. The diameter of the first retainer ring body C31 is decreased, and the first retainer ring body C31 can be clamped into the die head clamping groove E0.

Figure 16:
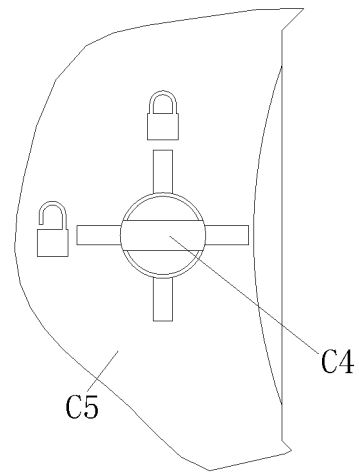
FIG. 16 is a local view of a first toothed disc assembly according to an embodiment of the present disclosure.

As shown in FIG. 16, when the eccentric shaft C4 is located at an open position shown in this figure, it makes the inner diameter of the first retainer ring C3 increased, such that the die head E can be mounted on the toothed disc assembly.

Figure 17:
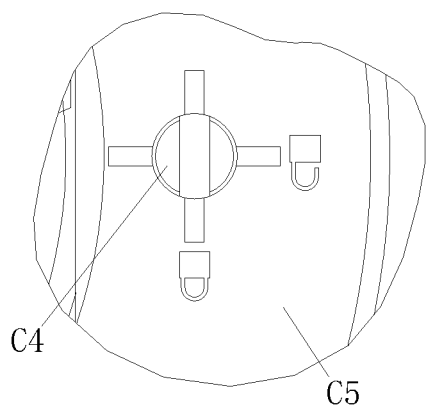
FIG. 17 is a local view of a first toothed disc assembly according to an embodiment of the present disclosure.
Figure 18:
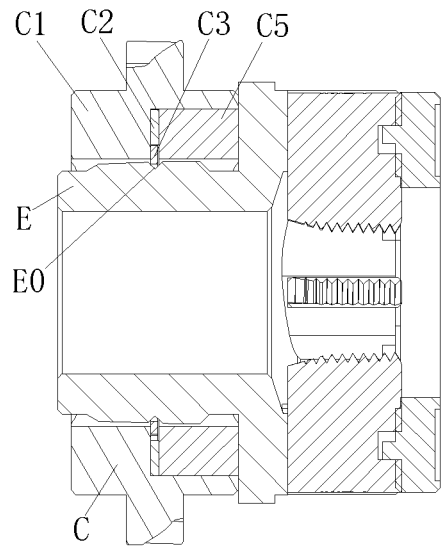
FIG. 18 is a sectional assembly view of a first toothed disc assembly and a die head according to an embodiment of the present disclosure.
Figures 19, 20:
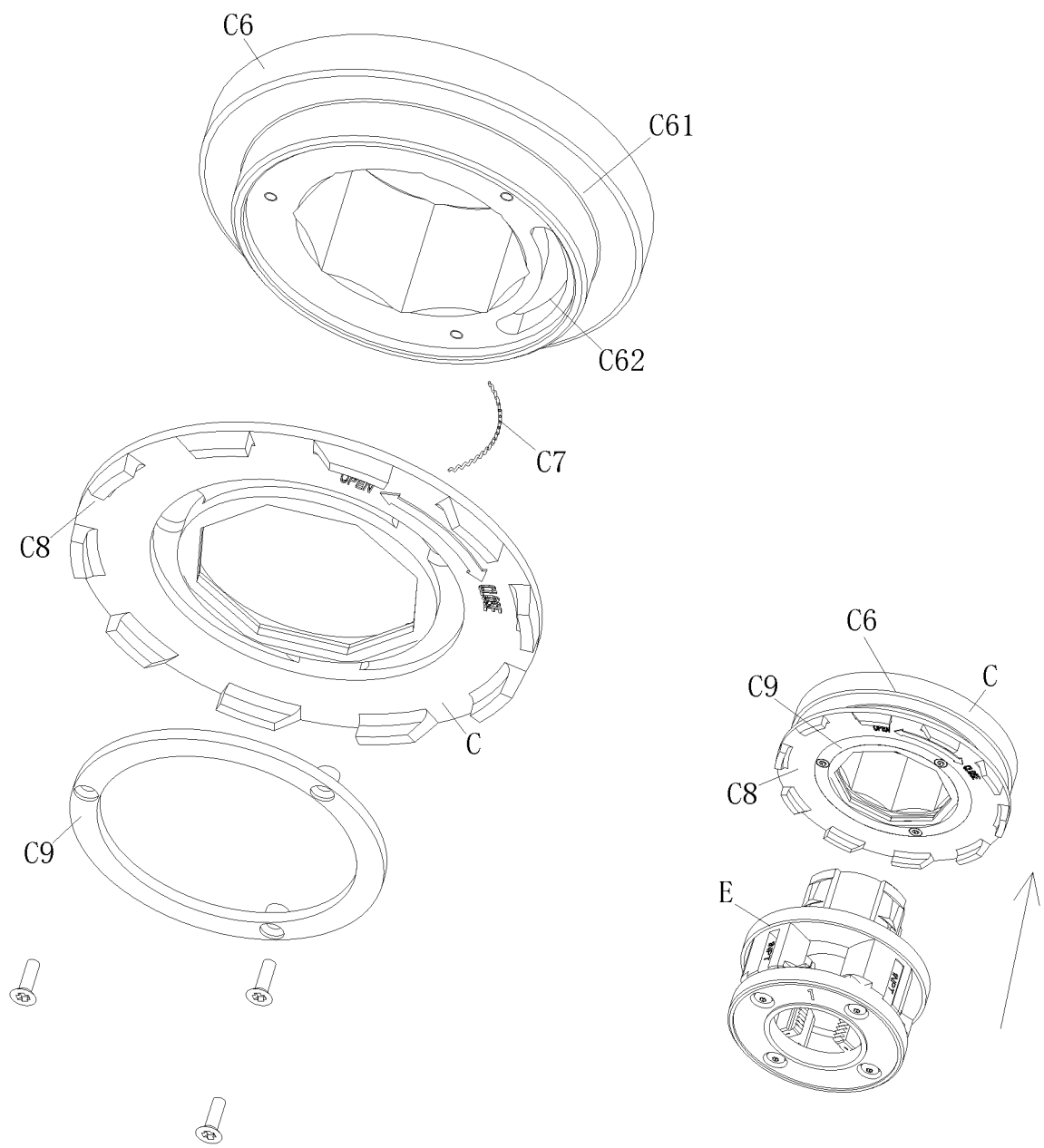
FIG. 19 is an exploded view of a second toothed disc assembly according to an embodiment of the present disclosure.
FIG. 20 is a schematic diagram of an assembly structure of a second toothed disc assembly and a die head according to an embodiment of the present disclosure.

As shown in FIG. 17, when the eccentric shaft C4 is located at a closed position shown in this figure, it makes the inner diameter of the first retainer ring C3 decreased and the first retainer ring C3 recessed into the die head clamping groove E0 of the die head E, so as to limit the axial movement of the die head E.

In this embodiment, regarding the second toothed disc assembly C (as shown in FIG. 19 to FIG. 24), the toothed disc assembly C includes a second toothed disc C6, a pressure spring C7, a limiting disc C8, and a second retainer ring C9. The limiting disc C8 is rotatably mounted on the second toothed disc C6 through the second retainer ring C9, and the two ends of the pressure spring C7 respectively abut against the second toothed disc C6 and the limiting disc C8.

In this embodiment, the second toothed disc C6 includes a second toothed disc body C61 and a toothed disc limiting groove C62. The toothed disc limiting groove C62 is arranged on the second toothed disc body C61. The limiting disc C8 includes a limiting disc body C81 and a limiting disc lug C82. The limiting disc lug C82 is arranged on the limiting disc body C81 and located in the toothed disc limiting groove C62. The pressure spring C7 is located in the toothed disc limiting groove C62, and both ends of the pressure spring C7 respectively abut against the toothed disc limiting groove C62 and the limiting disc lug C82.

In this embodiment, an octagonal hole arranged on the limiting disc C8 is superposed with or staggered from an octagonal opening arranged on the second toothed disc C6. The limiting disc C8 is clamped in the die head clamping groove E0 of the die head E. When the octagonal hole arranged on the limiting disc C8 is superposed with the octagonal opening arranged on the second toothed disc C6, the limiting disc body C81 is separated from the die head clamping groove E0. When the octagonal hole arranged on the limiting disc C8 is separated from the octagonal opening arranged on the second toothed disc C6, the limiting disc body C81 is clamped in the die head clamping groove E0.

Specifically, the pressure spring C7 is placed in the toothed disc limiting groove C62 of the second toothed disc C6. The limiting disc C8 and the second retainer ring C9 are mounted on the second toothed disc C6 through three cross countersunk head screws, and the limiting disc lug C82 on the limiting disc C8 is located in the toothed disc limiting groove C62. Moreover, both ends of the pressure spring C7 respectively abut against a side wall of the toothed disc limiting groove C62 and the limiting disc lug C82. The limiting disc C8 can rotate counterclockwise on the second toothed disc C6 in a limited manner, and the pressure spring C7 can make the limiting disc C8 position at a closed position.

Figure 21:
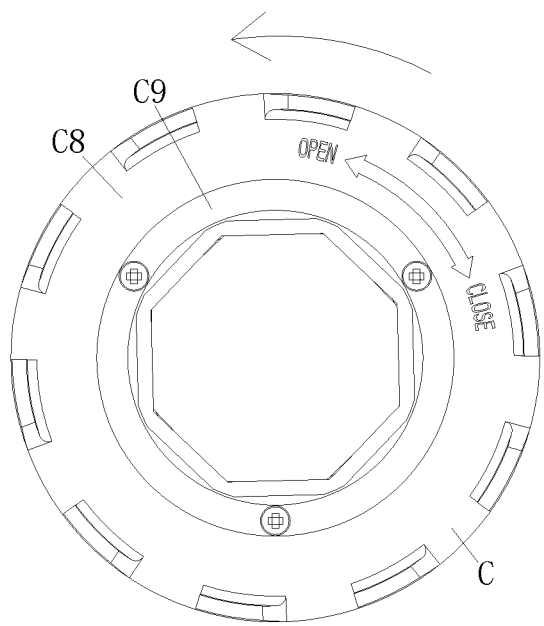
FIG. 21 is a front view of a second toothed disc assembly according to an embodiment of the present disclosure.
Figure 22:
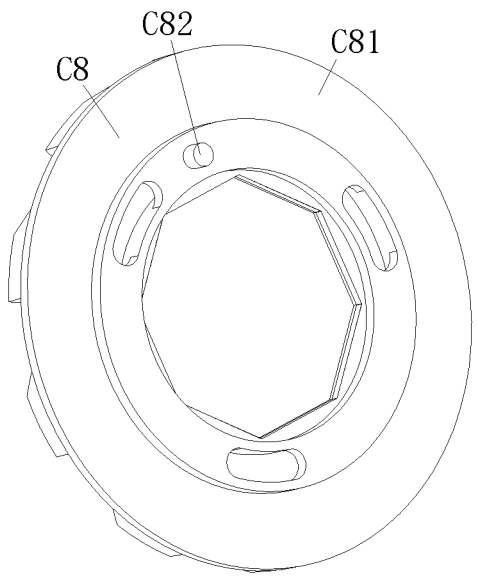
FIG. 22 is a perspective view of a second limiting disc according to an embodiment of the present disclosure.

As shown in FIG. 21, the elastic force of the pressure spring C7 can be overcome with a hand, such that the limiting disc C8 rotates in the OPEN direction. The octagonal hole of the second toothed disc C6 will be superposed with the octagonal hole of the limiting disc C8. At this time, the die head E can be mounted on the toothed disc assembly.

Figure 23:
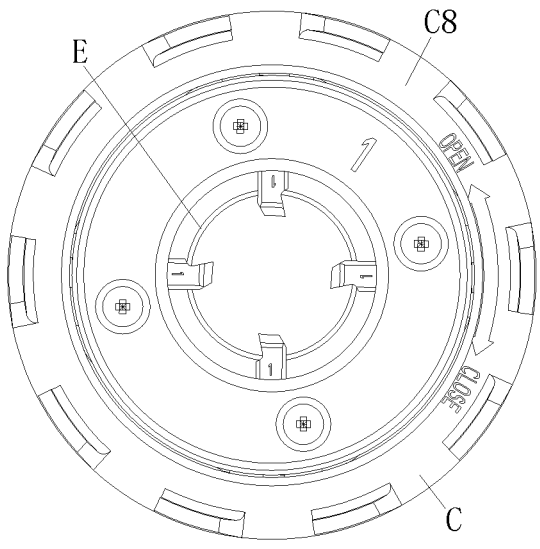
FIG. 23 is a schematic diagram of an assembly structure of a second toothed disc assembly and a die head according to an embodiment of the present disclosure.
Figure 24:
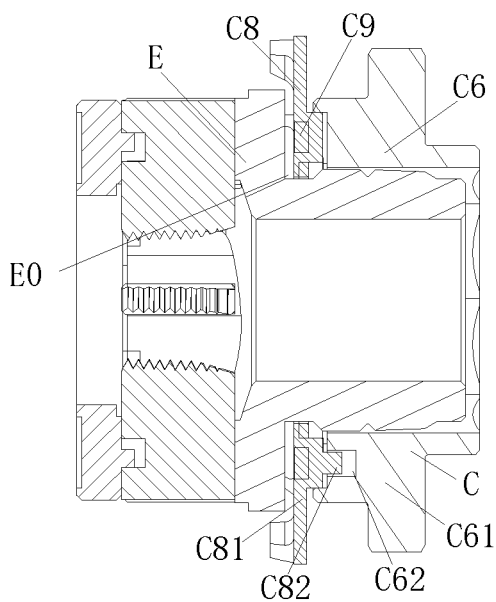
FIG. 24 is a sectional assembly view of a second toothed disc assembly and a die head according to an embodiment of the present disclosure.

As shown in FIG. 23, after the die head E can be mounted on the toothed disc assembly, the limiting disc C8 is loosened. Under the action of the pressure spring C7, the octagonal hole of the limiting disc C8 will be staggered from the octagonal hole of the second toothed disc C6. An edge of the octagonal hole of the limiting disc C8 is clamped in the die head clamping groove EO of the die head E to axially limit the die head E.

In this embodiment, the gearbox assembly F includes a gearbox housing F1 and a transmission mechanism F2. A housing handle F3 is provided on the gearbox housing F1. The transmission mechanism F2 is mounted in the gearbox housing F1 and provided with two ends that fit with the motor assembly A and the toothed disc assembly C.

In this embodiment, the transmission mechanism F2 includes a small arc-tooth conical shaft F21, a large arc-tooth conical gear F22, a first-stage gear shaft F23, a second-stage gear shaft F24, a third-stage gear shaft F25, and a transition gear F26. The small arc-tooth conical shaft F21 is mounted on the motor A1 of the motor assembly A and engaged with the large arc-tooth conical gear F22. The large arc-tooth conical gear F22 is mounted on the first-stage gear shaft F23. The first-stage gear shaft F23 is engaged with the second-stage gear shaft F24. The second-stage gear shaft F24 is engaged with the third-stage gear shaft F25. The third-stage gear shaft F25 is engaged with the transition gear F26. The transition gear F26 is engaged with the toothed disc assembly C.

In this embodiment, the support arm body assembly D includes a support arm body bracing piece D1, a support arm body D2, a support arm body ejector pin D3, and a support arm body handle D4. The support arm body bracing piece D1 and the support arm body ejector pin D3 are both mounted on the support arm body D2, and the support arm body handle D4 is mounted on the support arm body ejector pin D3.

Figure 25:
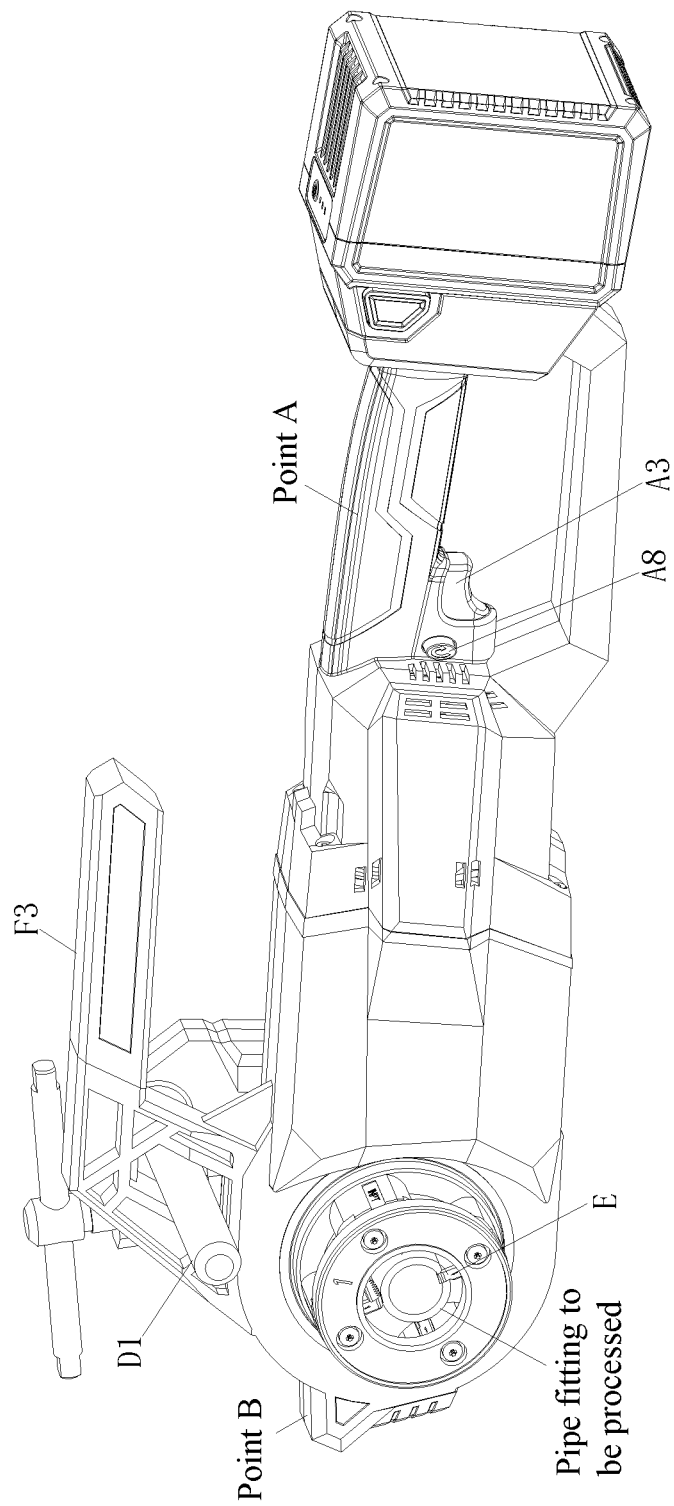
FIG. 25 is a perspective view of a handheld lithium battery threading machine according to an embodiment of the present disclosure.

In this embodiment, the threading method of a handheld lithium battery threading machine includes the following steps:

S1, preparation before work, specifically as follows:

S11, fix a support arm body assembly D on a pipe fitting to be processed, as shown in FIG. 1, rotate a support arm body handle D4 clockwise, such that a support arm body ejector pin D3 can move toward the pipe fitting, and forcedly rotate the support arm body handle D4 to fix the pipe fitting between a support arm body D2 and the support arm body ejector pin D3; and S12, place a die head E into a toothed disc assembly C, as shown in FIG. 25, sleeve an inner hole of the die head E on the pipe fitting by holding a housing handle F3 with one hand, align a support arm body bracing piece D1 to a support hole of a gearbox housing F1, and push the handheld lithium battery threading machine to the pipe fitting with the other hand by taking a point B as a stress point to enable an end surface of the pipe fitting to be in contact with a die of the die head E; and S2, working stage, specifically as follows:

S21, spray a little thread-cutting oil for threading to the pipe fitting through a gap of the die head E with a thread-cutting oil gun; and S22, press an counterclockwise marked end (right-handed threads, and left-handed threads are opposite) of a switch reversing rod A8, hold a point A on a handle of a motor assembly A with one hand, pull up a main switch A3 with a forefinger (the forefinger cannot loosen the button, or the work is stopped) to start the work of a motor body A11, drive the toothed disc assembly C to rotate counterclockwise, press the point B with the other hand, apply a little force toward the pipe fitting at the point A and the point B with the two hands, such that the die on the die head E can process threads on the pipe fitting, apply no force with the two hands after 0.5 to 1 turn of threads is processed, intermittently spray the thread-cutting oil for threading to the pipe fitting through the gap of the die head at this time, loosen the forefinger that pulls up the main switch A3 when an end surface of the pipe fitting is flush with an end surface of the die of the die head E to stop the work of the motor body A11, press a clockwise marked end of the switch reversing rod A8, hold the point A on the handle of the motor assembly A, pull up the main switch A3 with the forefinger to enable the motor body A11 to drive the toothed disc assembly C and the die head E to rotate clockwise, such that the die head E is withdrawn from the pipe fitting; and rotate a support arm body handle D4 counterclockwise to separate a support arm body ejector pin D3 from the pipe fitting, and take down the support arm body assembly D to complete processing of pipe external threads of the pipe fitting once.

In addition, it should be noted that the specific embodiments described in this specification may have parts and components with different shapes and names, and the above content described in this specification is only an illustration of the structure of the present disclosure. All equivalent changes or simple changes made according to the structure, features and principles described in the patent concept of the present disclosure are included in the protection scope of the patent of the present disclosure. Various modifications or supplementations of the specific embodiments described or substitutions in a similar manner made by those skilled in the art without departing from the concept of the present disclosure or going beyond the scope as defined in the appended claims should fall within the protection scope of the present disclosure.

What is claimed is:

1. A handheld lithium battery-powered threading machine, comprising a die head, a motor assembly, a lithium battery assembly, a toothed disc assembly, a support arm body assembly, and a gearbox assembly, wherein
the lithium battery assembly is connected to the motor assembly, the motor assembly and the toothed disc assembly are respectively mounted at two ends of the gearbox assembly, the die head is mounted on the toothed disc assembly, and the support arm body assembly is mounted on the gearbox assembly; and
the motor assembly comprises a motor, a handle, an air inlet window, and an air outlet window, wherein the motor is mounted on the handle, and both the air inlet window and the air outlet window are arranged on the handle;
wherein the motor comprises a motor body, a motor control panel, a signal seven-plug connector, a power three-plug connector, and a signal three-plug connector, wherein
the motor body and the motor control panel are mounted in the handle, the motor body is connected to the motor control panel through the signal seven-plug connector and the power three-plug connector, the motor control panel is connected to a main switch through the signal three-plug connector, and the motor control panel is connected to a male plug.

2. The handheld lithium battery-powered threading machine according to claim 1, wherein the motor assembly further comprises the male plug and the main switch, wherein
both the male plug and the main switch are mounted on the handle, the motor is connected to the male plug and the main switch, and the male plug is connected to a female plug of the lithium battery assembly.

3. The handheld lithium battery-powered threading machine according to claim 1, wherein the lithium battery assembly comprises a battery cover, a battery box, a battery cell, a battery control panel, two buckle mechanisms, and a female plug, wherein
the female plug is arranged on the battery control panel, the battery cell is connected to the battery control panel, the battery cell and the battery control panel are mounted in the battery box, the battery cover is mounted on the battery box, and the two buckle mechanisms are mounted on the battery cover; and,
the lithium battery assembly further comprises a battery limiting recess and a battery limiting lug, wherein the battery limiting recess is arranged on the handle of the motor assembly, and the battery limiting lug is arranged on the battery cover and located in the battery limiting recess.

4. The handheld lithium battery-powered threading machine according to claim 3, wherein each of the two buckle mechanisms comprises a respective buckle button, a respective buckle pressure spring, a respective buckle positioning pillar, a respective buckle fixture block, and a respective buckle slot, wherein
the buckle buttons are mounted on the battery cover, the buckle positioning pillars and the buckle fixture blocks are arranged on the buckle buttons, the buckle pressure springs are sleeved on the buckle positioning pillars and the buckle pressure springs are each provided with a respective two ends in butt joint with the battery cover and the buckle buttons, the buckle slots are each arranged on a respective side wall of the battery limiting recess, and the buckle fixture blocks are located in the buckle slots.

5. The handheld lithium battery-powered threading machine according to claim 1, wherein the toothed disc assembly comprises a first toothed disc, a gasket, a first retainer ring, an eccentric shaft, and an octagonal component, wherein
the gasket, the first retainer ring, and the octagonal component are mounted on the first toothed disc, the gasket is sleeved outside the first retainer ring, and two ends of the eccentric shaft are respectively mounted on the first toothed disc and the octagonal component.

6. The handheld lithium battery-powered threading machine according to claim 1, wherein the gearbox assembly comprises a gearbox housing and a transmission mechanism, wherein
the transmission mechanism is mounted in the gearbox housing,
the transmission mechanism comprises an arc-tooth conical shaft, an arc-tooth conical gear, a first-stage gear shaft, a second-stage gear shaft, a third-stage gear shaft, and a transition gear, wherein
the arc-tooth conical shaft is mounted on the motor of the motor assembly and the arc-tooth conical shaft is engaged with the arc-tooth conical gear, the arc-tooth conical gear is mounted on the first-stage gear shaft, the first-stage gear shaft is engaged with the second-stage gear shaft, the second-stage gear shaft is engaged with the third-stage gear shaft, the third-stage gear shaft is engaged with the transition gear, and the transition gear is engaged with the toothed disc assembly.

7. The handheld lithium battery-powered threading machine according to claim 1, wherein the support arm body assembly comprises a support arm body bracing piece, a support arm body, a support arm body ejector pin, and a support arm body handle, wherein the support arm body bracing piece and the support arm body ejector pin are mounted on the support arm body, and the support arm body handle is mounted on the support arm body ejector pin.

8. A threading method using the handheld lithium battery-powered threading machine according to claim 1, wherein the threading method comprises the following steps:

S1, preparation before work, specifically as follows:

S11, fixing the support arm body assembly on a pipe fitting to be processed by rotating a support arm body handle clockwise to enable a support arm body ejector pin to move towards the pipe fitting, and fixing the pipe fitting between a support arm body and the support arm body ejector pin; and S12, placing the die head into the toothed disc assembly, sleeving an inner hole of the die head on the pipe fitting, aligning a support arm body bracing piece with a support hole of a gearbox housing, and pushing the handheld lithium battery-powered threading machine to the pipe fitting by taking a second point as a stress point to enable an end surface of the pipe fitting to be in contact with a die of the die head; and S2, working stage, as follows:

S21, spraying oil for threading to the pipe fitting through a gap of the die head; and S22, pressing a counterclockwise marked end of a switch reversing rod, holding a first point on a handle of the motor assembly, pulling the main switch to start the work of the motor body, driving the toothed disc assembly to rotate counterclockwise, pressing the second point, applying a force toward the pipe fitting at the first point and the second point, processing threads on the pipe fitting by the die on the die head, applying no force after 0.5 to 1 turn of threads is processed, intermittently spraying the oil for threading to the pipe fitting through the gap of the die head, loosening pressure applied to the main switch when the end surface of the pipe fitting is flush with an end surface of the die of the die head, stopping the motor body, pressing a clockwise marked end of the switch reversing rod, holding the first point, pulling the main switch, enabling the motor body to drive the toothed disc assembly and the die head to rotate clockwise, such that the die head is withdrawn from the pipe fitting; and rotating the support arm body handle counterclockwise to separate the support arm body ejector pin from the pipe fitting, and taking down the support arm body assembly to complete processing of pipe external threads of the pipe fitting.

\* \* \* \* \*